(12) United States Patent
Hendrix

(10) Patent No.: US 10,556,194 B2
(45) Date of Patent: *Feb. 11, 2020

(54) OIL AND GAS WELL PRIMARY SEPARATION DEVICE

(71) Applicant: Stuart Petroleum Testers, Inc., The Woodlands, TX (US)

(72) Inventor: Glen Hendrix, Magnolia, TX (US)

(73) Assignee: Stuart Petroleum Testers, Inc., The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/948,824

(22) Filed: Apr. 9, 2018

(65) Prior Publication Data

US 2018/0221789 A1 Aug. 9, 2018

Related U.S. Application Data

(63) Continuation of application No. 14/245,819, filed on Apr. 4, 2014, now Pat. No. 9,937,442.

(60) Provisional application No. 61/813,744, filed on Apr. 19, 2013.

(51) Int. Cl.
*B01D 19/00* (2006.01)
*E21B 43/34* (2006.01)

(52) U.S. Cl.
CPC .......... *B01D 19/0031* (2013.01); *E21B 43/34* (2013.01)

(58) Field of Classification Search
CPC ........... B01D 19/00–0495; E21B 43/34; E21B 21/06–07
USPC ......... 95/241; 96/219; 138/41; 210/513–540
See application file for complete search history.

(56) References Cited

U.S. PATENT DOCUMENTS

| 5,775,442 A * | 7/1998 | Speed ................... E21B 21/067 |
| | | 175/206 |
| 6,315,813 B1 | 11/2001 | Morgan et al. |
| 7,785,400 B1 | 8/2010 | Worley et al. |
| 9,937,442 B2 | 4/2018 | Hendrix |
| 2012/0097039 A1 | 4/2012 | Vandenbulcke |

* cited by examiner

*Primary Examiner* — T. Bennett McKenzie
(74) *Attorney, Agent, or Firm* — Mackey Law Firm PLLC

(57) ABSTRACT

A primary separation apparatus for separating natural gas from high pressure, high velocity production streams comprising a liquid dispersion of water, sand, natural gas, and isolation plug cuttings.

15 Claims, 3 Drawing Sheets

OIL AND GAS WELL PRIMARY SEPARATION DEVICE

CROSS-REFERENCE TO RELATED APPLICATION

This application claims priority under 35 U.S.C. § 119(e) to U.S. Provisional Application Ser. No. 61/813,744 filed Apr. 19, 2013, which is incorporated herein by reference in its entirety.

BACKGROUND OF THE INVENTION

1. Field of the Invention

This invention relates to oil and gas well completion and production.

2. Description of the Prior Art

Geologists have known for years that substantial deposits of oil and natural gas are trapped in deep shale formations. Around the world today, with modern horizontal drilling techniques and hydraulic fracturing, the trapped oil and natural gas in these shale reservoirs is being produced, gathered and distributed to customers.

Initially, a vertical hole is drilled in a formation down to a depth below the water table, and steel casing is inserted into the borehole and cemented in place, thus providing an impermeable barrier between the water table and borehole. Vertical drilling continues to a depth called the "kick-off" point, where the wellbore begins curving to become horizontal. One advantage of horizontal drilling is that it is possible to drill several wells from only one drilling pad, minimizing the impact to the surface environment. When the targeted distance is reached, the drill pipe is removed from the borehole, and additional steel casing is inserted through the full length of the wellbore and cemented in place.

The drilling rig is then removed and preparations for well completion are then undertaken. The first step is to create a connection between the final casing and the reservoir rock. To do so, a device known as a perforating gun, equipped with shaped explosive charges, is lowered into the wellbore down to the layer containing oil and/or natural gas. The perforating gun is then fired, which creates holes through the casing, cement, and into the target reservoir rock. Next, a mixture of water, sand and other chemicals is pumped into the deep underground reservoir formations, which creates fractures in the reservoir rock. A propping agent, usually sand carried by the high viscosity fluid, is pumped into the fractures to keep them from closing when the pumping pressure is released. This initial stimulation segment is then isolated with a specially designed plug inserted into the steel casing to seal off the perforated (and thus the fractured reservoir) and prevent production from the isolated section. The perforating gun is then moved to the next stage of the wellbore to perform the same process, which is then hydraulically fractured in the same manner. This process is repeated along the entire horizontal section of the well, which may extend several miles.

Once the stimulation is complete, the isolation plugs are drilled out and production begins. Initially water, and then natural gas or oil flows into the horizontal casing and up the wellbore. In the course of initial production of the well, approximately 15 to 50% of the fracturing fluid may be recovered, a process known as "flowback." The purpose of the flowback is to safely recover these substances from the well and transition the marketable hydrocarbons of the well stream to a sales pipeline or storage tank. The fracturing fluid is then either recycled to be used on other fracturing operations or safely disposed of according to government regulations.

The fracturing process described above requires equipment to handle and separate drilled isolation plug cuttings along with large volumes of sand, fracturing fluids, and oil and natural gas. The drilled isolation plug cuttings and sand need to be separated to keep from plugging other fluid clean up and separation equipment, which may cause a loss of circulation detrimental to downhole tools. Accordingly, a device is needed to efficiently separate drilled isolation plug cuttings, sand, fracturing fluids and oil and natural gas during a flowback process of production of fluids from the wellbore.

3. Identification of the Objects of the Invention

An object of the invention is to accomplish one or more of the following: Provide an apparatus for primary separation in fracking operations that combines isolation plug cutting separation, sand separation, and gas separation in a single separation assembly.

SUMMARY OF THE INVENTION

In one aspect, embodiments disclosed herein relate to an apparatus for separating natural gas from high pressure, high velocity production streams comprising a liquid dispersion of water, sand, natural gas, and isolation plug cuttings. The apparatus includes a housing having a first end and a second end, and an interior cavity extending therebetween, and an inlet port disposed at said first end of said housing. A flow sleeve is disposed within said interior cavity of said housing and extending from said first end to said second end of said housing, and a first screen is disposed within said flow sleeve and in fluid communication with said inlet port. An annulus is formed between an outer diameter of said first screen and an inner diameter of said flow sleeve. A baffle is disposed within said interior cavity at said second end of said housing, and said baffle is arranged and designed to enhance separation of said production stream into its constituents, a liquid drain in a lower portion of said housing, a second screen coupled to an upper portion of said housing, and a gas outlet.

BRIEF DESCRIPTION OF THE DRAWINGS

The invention is illustrated in the accompanying drawings wherein.

DESCRIPTION OF EMBODIMENTS OF THE INVENTION

Figure 1A:
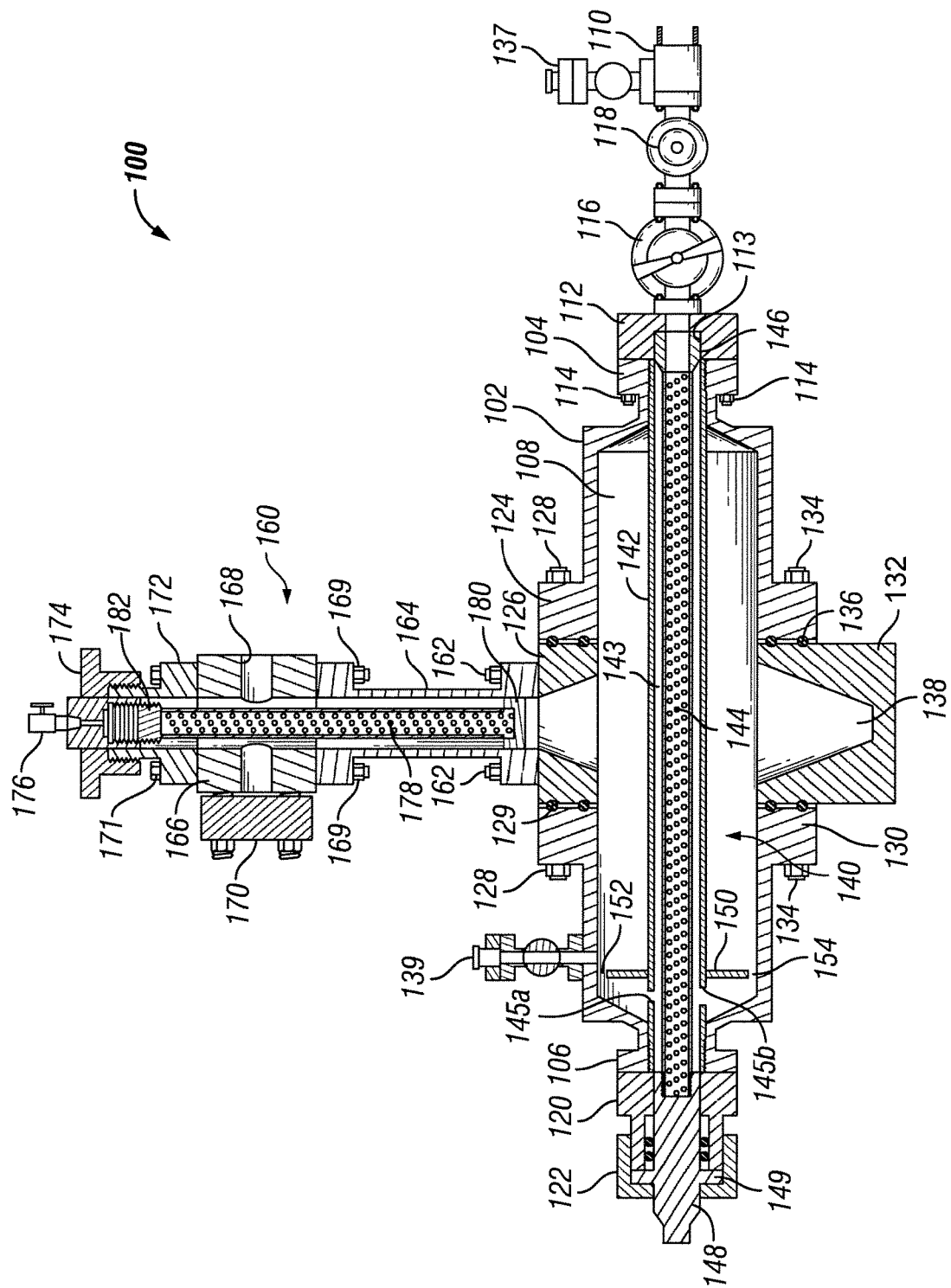
FIG. 1A illustrates a cross-section view of a primary separator in accordance with one or more embodiments of the present disclosure.

The aspects, features, and advantages of the invention mentioned above are described in more detail by reference to the drawings, wherein like reference numerals represent like elements. FIG. 1 illustrates a cross-section view of a primary separator 100 in accordance with one or more embodiments of the present disclosure.

Main Housing

The primary separator 100 includes a generally cylindrical main housing 102 having a first flange 104 on a first end and a second flange 106 on a second end. The main housing 102 complies with all PSL-3 NACE $H_2S$ specifications. The main housing 102 is rated for pressures of at least 5,000 psi, 10,000 psi, 15,000 psi, and up to 20,000 psi. A generally cylindrical interior cavity 108 or bore is formed within the main housing 102. An inlet port 110 may be coupled to the main housing 102 by way of a first adaptor 112 that is fastened to the first flange 104 with one or more threaded fasteners 114. One or more valves 116, 118 may be disposed between the inlet port 110 and adaptor 112. Valves 116, 118 may be gate valves, either manually or hydraulically operated, or other valves known to one of ordinary skill in the art for opening or closing inlet port 110 to allow production fluid to enter the primary separator 100. Alternatively, inlet port 110 may be fastened directly to the first flange 104 of the main housing 102. A pressure gauge 137 may be coupled to the inlet port 110 and arranged and designed to monitor pressure entering the inlet port 110.

A second adaptor 120 may be fastened to the second flange 106 of the main housing 102 by way of one or more fasteners (not shown). Further, an end cap 122 may have an internal thread that engages an external thread of the second adaptor 120 and is threaded thereon. The end cap 122 is preferably removable from the second adaptor 120. Alternatively, the end cap 122 may be attached directly to the second flange 106 of the main housing 102 by way of one or more threaded fasteners.

The main housing 102 further includes a top flange 124. A top flow adaptor 126 is disposed within the top flange 124 and secured therein by way of one or more threaded fasteners 128. The top flow adaptor 126 may have a flow channel therein that decreases in diameter from a bottom surface of the flow adaptor to the top surface. One or more sealing members 130 may be installed between the top flow adaptor 126 and the top flange 124.

The main housing 102 also includes a bottom flange 130. A bottom flow adaptor 132 or flow block is disposed within the bottom flange 130 and secured therein by way of one or more threaded fasteners 134. The bottom flow adaptor 132 may have a flow channel therein that decreases in diameter from a top surface of the flow adaptor to a bottom surface. One or more sealing members 136 may be installed between the bottom flow adaptor 132 and the bottom flange 130. The bottom flow adaptor 132 includes an outlet port 138 or drain through which fluid or sediment may flow out of the main housing 102.

Finally, a pressure gauge 139 may be coupled to the main housing 102 and arranged and designed to monitor pressure within the interior cavity 108 of the main housing 102.

Plug Cuttings Screen Assembly

A screen assembly 140 is disposed within the interior cavity 108 of the main housing 102. The screen assembly 140 includes a flow sleeve 142 that extends within the interior cavity 108 of the main housing from a first end to a second end of the main housing 102. A first end of the flow sleeve 142 is threaded within the first flange 104 of the main housing 102 and abuts the first adaptor 112 coupled to the first flange 104. A second end of the flow sleeve 142 is threaded within the second flange 106 and abuts the second adaptor 120. The flow sleeve 142 is preferably a hollow cylindrical tube having an inner diameter of at least about 3 inches, 4 inches, or 5 inches, up to about 6 inches, 7 inches or 8 inches. The flow sleeve 142 has one or more ports 145a and 145b located proximate the second end of the flow sleeve 142, which allow gas and fluid to exit the flow sleeve 142 and enter the interior cavity 108 of the main housing 102. As best illustrated in FIG. 1B, upper port 145a may have a diameter of at least about ½ inch, ¾ inch, or 1 inch, up to about 1½ inches, 1¾ inches, or 2 inches. Lower port 145b may have a diameter of at least about 1½ inches, 2 inches, or 2½ inches, up to about 3 inches or 4 inches.

A screen 144 is disposed within the flow sleeve 142. The screen 144 is concentrically oriented within the flow sleeve 142 and extends axially within the flow sleeve 142. A first end of the screen 144 has a collar 146 attached thereto (e.g., welded). The collar 146 is adapted to fit within a seat or pocket 113 of the first adaptor 112 coupled to the first flange 104. A second end of the screen 144 has a collar 148 attached thereto (e.g., threaded as shown, or welded). The collar 148 is adapted to fit within the second adaptor 120 and extend through an aperture in the end cap 122. The collar 148 has a flange 149, which abuts between surfaces of the second adaptor 120 and the end cap 122. When the end cap 122 is installed over the collar 148 and threaded onto the second adaptor 120, the interface between the flange 149 of the collar 148 between the second adaptor 120 and the end cap 122 prevents movement of the screen 142 in an axial direction. Removal of the end cap 122 allows the screen 142 to be removed, either for replacement or cleaning.

The screen 144 is preferably a stainless steel hollow cylindrical tube that has a plurality of perforations to allow a fluid to enter the hollow tube and radially exit the screen through the plurality of perforations. The screen may have an inner diameter of at least about 1 inch, 2 inches, or 3 inches, up to about 4 inches, 5 inches, or 6 inches. An annulus 143 is formed between an outer diameter of the screen 144 and an inner diameter of the flow sleeve 142. Perforations in the screen 144 may have a diameter of at least about ⅛ inch, ¼ inch, or ⅜ inch up to about ½ inch, 9/16 inch, ⅝ inch, ¾ inch, or 1 inch. In other embodiments, perforations in the screen 144 may have a diameter of up to about 1½ inches, 2 inch, or 3 inches.

Further, a baffle 150 is located within the interior cavity 108 at a second end of the main housing 102 proximate the second flange 106. The baffle 150 is preferably a plate welded or otherwise attached to an outer diameter of the flow sleeve 142. The plate may be at least about 1 inch in thickness, and up to about 3 inches in thickness. The baffle 150 is extends radially outward from the outer diameter of the flow sleeve 142 towards an inner wall of the housing 102. The baffle 150 is sized to have an outer diameter that is less than an inner diameter of the housing 102 so that an upper passageway 152 and a lower passageway 154 (e.g., gaps) are formed there between. The baffle 150 is arranged and designed to distribute fluid flow exiting from ports 145a and 145b into a larger pattern within the interior cavity 108 of the housing 102 and to further separate gas from fluids.

Gas Separator Assembly

A gas separator assembly 160 is coupled to the top flow adaptor 126 by way of one or more threaded fasteners 162. The gas separator assembly 160 includes a riser spool or lower body 164 having a central bore there through. An outlet body 166 having one or more outlets 168, both radial and longitudinal, may be coupled to the lower body 164 by way one or more threaded fasteners 169. In certain embodiments, a blind flange 170 may be disposed over at least one of the radial outlets thereby directing fluid out remaining radial outlets 168. A tree cap 170 may be fastened to the outlet body 166 by way of one or more threaded fasteners 171. Finally, a threaded cap 174 having internal threads may be threaded onto external threads of the tree cap 172.

Alternatively, the gas separator assembly 160 may comprise or be formed as a single integral housing attached to the top flow adaptor 126 of the main housing 102 and comprising the individual components previously described in a single integral component.

The gas separator assembly 160 further includes a screen 178 disposed therein. The screen 178 is preferably a stainless steel hollow cylindrical tube that has a plurality of perforations to allow a fluid to enter the hollow tube and radially exit the screen through the plurality of perforations. The screen 178 may have an outer diameter of at least about 1 inch, 2 inches, or 3 inches, up to about 4 inches, 5 inches or 6 inches. Perforations in the screen 178 may have a diameter of at least about 20 microns, 30 microns, or 40 microns, up to about 50 microns, 60 microns, 70 microns or 80 microns. In other embodiments, the perforations may have a diameter up to about ⅛ inch, ¼ inch, ½ inch or 1 inch.

A lower end of the screen 178 may be installed in a seat 180 attached within a lower end of the lower body 164. For example, the seat 180 may be welded within the lower body 164. An upper end of the screen 178 may comprise a collar 182, attached to the screen 178, either welded or threaded. The collar 182 is adapted to fit within the tree cap 172 and extend through an aperture in the threaded cap 174. Removal of the threaded cap 174 allows the screen 178 to be removed, either for replacement or cleaning. In certain embodiments, the collar 182 may have a needle valve 176 or the like installed therein for pressure adjustment within the gas separator assembly 160.

METHODS OF USE

Figure 2:
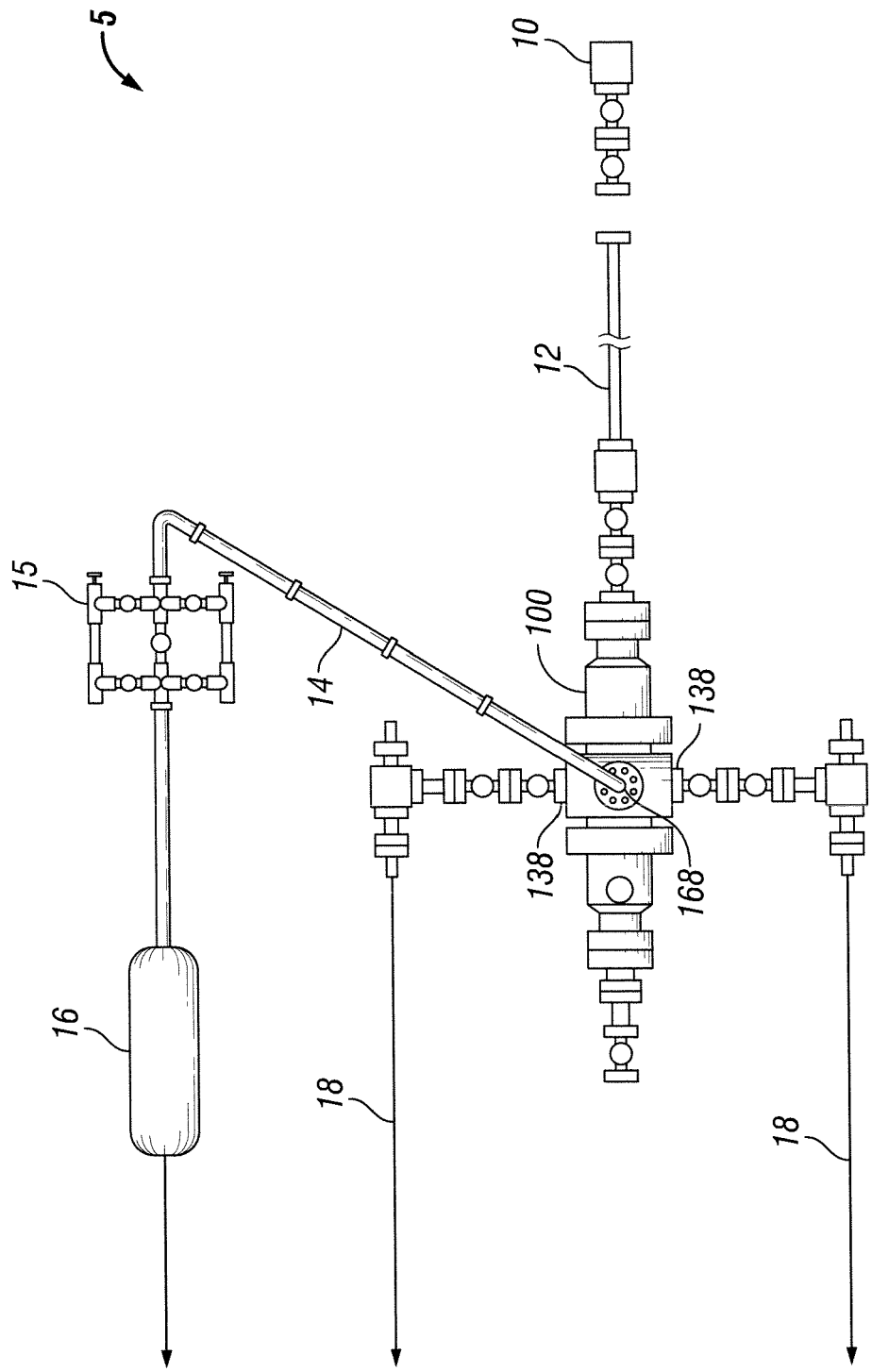
FIG. 2 the primary separator of FIG. 1A on location.

FIG. 2 is a simplified schematic showing the primary separator 100 installed in a flowback system 5. A fracturing tree 10 ("frac tree") is disposed on a producing well from which a production fluid containing a mixture of fracking fluids, drilled isolation plug cuttings, oil and natural gas, water, and sand or other sediment flows. The production fluid flows from the frac tree 10 through a fluid line 12 and enters the primary separator 100. The primary separator 100 separates drilled plug cuttings, natural gas, and fluid and sand in a single integral primary separator 100.

Figure 1B:
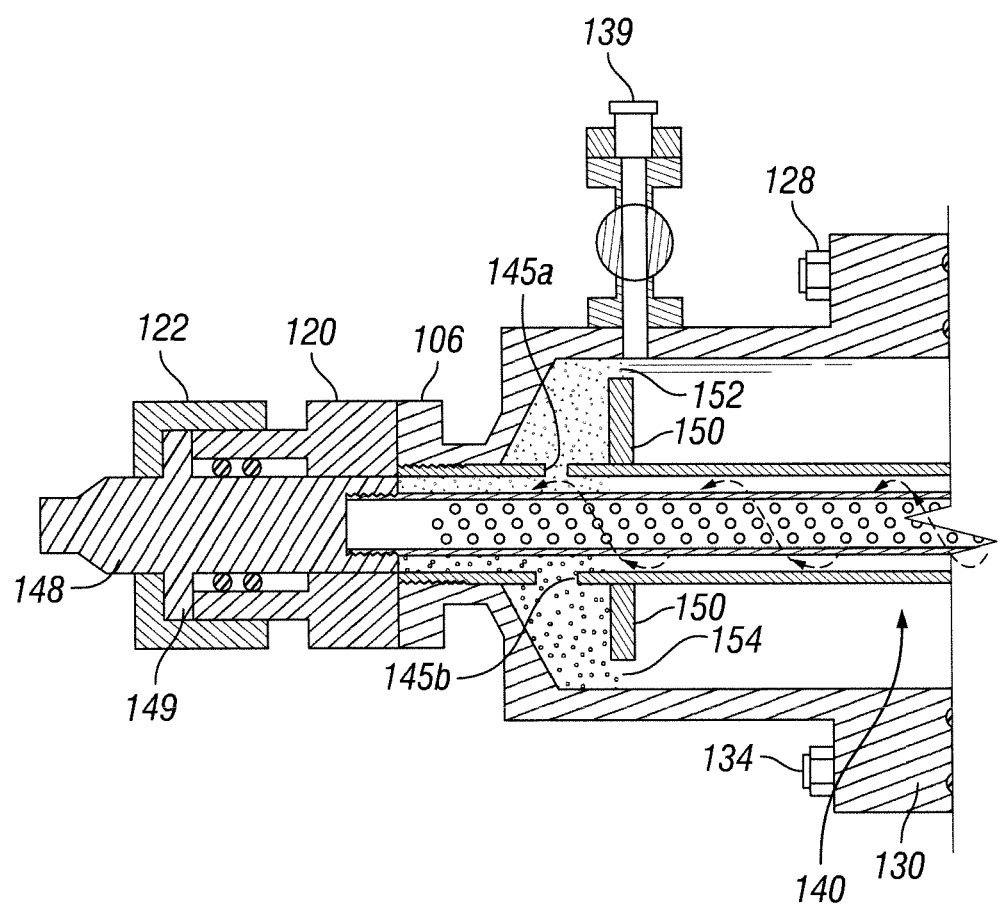
FIG. 1B illustrates an enlarged cross-section view of a second end of the primary separator of FIG. 1A.

In reference to FIGS. 1A and 1B, the production stream enters the primary separator 100 through the inlet port 110 and flows into screen 144. As the production fluid flows through the screen 144, fluids, including fracking fluids, oil and natural gas, and water, and smaller solid matter such as sand particles and similar sediment pass radially outward through the plurality of perforations in the screen 144 into the annulus 143 formed between the screen 144 and flow sleeve 142. Larger solids, particularly, drilled isolation plug cuttings are caught within the screen 144 and prevented from passing through the plurality of perforations. Fluid and smaller solids continue to flow either through screen 144 or within annulus 143 (e.g., in a swirling motion as shown in FIG. 1B) until they reach a second end of the screen assembly 140 and ports 145a and 145b. Some separation of gas particles from the fluids and smaller solids occurs in the annulus 143 through cyclonic separation (i.e., swirling motion), which will be understood by one of ordinary skill in the art.

Once the swirling flow reaches a second end of the flow sleeve 142 and annulus 143, fluids and smaller solid matter within the annulus 143 flow downward through lower port 145b, while gas particles flow upward through upper port 145a. Fluids and smaller solid matter as well as gas particles then encounter the flow baffle 150, which is arranged and designed to cause flow distribution and encourage further separation of gas from well fluids such as oil, water, and/or fracking fluids, and sand or sediment.

Fluid and sand separation from the gas within the primary separation device is dependent on gravity and retention time. In certain embodiments, fluid may circulate through the primary separation device at a rate of between about two and three barrels per minute. In other embodiments, fluid may circulate through the primary separation device at a rate of between about two and twenty barrels per minute. Once separated from the gas, fluids and solid matter flow downward through the lower port 154 of the flow baffle 150 to the liquid drain 138 at the bottom of the main housing 102. Once separated from fluids and solid matter at the baffle, the gas flows through the upper port 152 of the flow baffle 150 to an upper portion of the main housing 102. The gas enters the gas separator assembly 160, where the gas flows into the screen 178. As gas flows radially outward through the plurality of perforations in the screen 178, sand and other small sediment is filtered and remains in the screen 178. Filtered gas then exits the gas separator assembly 160 by way of outlet 168.

As shown in FIG. 2, filtered gas exiting outlet 168 flows through a gas line 14, through a flow regulator 15 (e.g., a choke valve), and may be further processed in a three-phase separator 16. Liquid and solid matter exiting liquid drain 138 may flow through a fluid-sand clean-up line 18 to one or more deposit tanks (not shown).

Advantageously, the primary separator provides separation of drilled isolation plug cuttings, gas, and well fluids and sand in a single assembly before said constituents reach other fluid handling equipment not suitable for handling such a mixture. What's more, the combined separation capabilities of drilled isolation plug cuttings, gas, and well fluids and sand in a single assembly greatly reduces the footprint for such equipment, where floor space is often at a premium. Additionally, the removable screens allow screens to be easily removed and cleaned or replaced, which increases the efficiency of the separation process. Furthermore, once the isolation plugs are drilled and the well is being cleaned up, the primary separator described herein may perform as a sand trap, which may include one or more sand filters to trap trace sand. In other words, screen 144 may be replaced in about ten minutes or less with a sand filter having from 20 to 80 micron perforations.

What is claimed is:

1. An apparatus for separating natural gas from a production stream, the apparatus comprising:
   - a housing having a first end, a second end and an interior cavity disposed at least partially therebetween;
   - an inlet port in fluid communication with the first end of the housing;
   - a flow sleeve disposed at least partially within the interior cavity of the housing and in fluid communication with the inlet port;
   - a first screen disposed at least partially within the flow sleeve and in fluid communication with the inlet port;
   - an annulus disposed radially between the first screen and the flow sleeve;
   - a baffle disposed within the interior cavity fluidically downstream from at least a portion of the first screen;
   - a liquid drain in fluid communication with the interior cavity and disposed fluidically downstream from the baffle;

a gas separator body extending from the housing and disposed in fluid communication with the interior cavity, the gas separator body having a gas outlet; and a second screen disposed at least partially within the gas separator body, wherein at least a portion of the second screen is disposed fluidically between the interior cavity of the housing and the gas outlet.

2. The apparatus of claim 1, wherein the first screen comprises a plurality of perforations having a diameter of at least about 1/8 inch up to about 3 inches.

3. The apparatus of claim 1, further comprising one or more ports through the flow sleeve fluidically between at least a portion of the first screen and the baffle.

4. The apparatus of claim 1, wherein the second screen comprises a plurality of perforations having a diameter of at least about 20 microns up to about 1 inch.

5. The apparatus of claim 1, wherein the baffle has an outer diameter that is greater than an outer diameter of the flow sleeve and less than an inner diameter of the interior cavity of the housing.

6. The apparatus of claim 1, further comprising a pressure gauge fluidically coupled to the inlet port upstream of the interior cavity.

7. The apparatus of claim 1, further comprising a pressure gauge coupled to the housing and configured to monitor pressure within the interior cavity.

8. The apparatus of claim 1, wherein the first and second screens are removably coupled to the housing and gas separator body, respectively.

9. The apparatus of claim 1, further comprising a collar having a flange, wherein the collar is removably coupled to the second end of the body and configured to prevent movement of the first screen.

10. The apparatus of claim 1, wherein the second screen is transverse to the first screen.

11. The apparatus of claim 1, wherein the baffle extends radially outwardly from the flow sleeve and is disposed closer to the second end of the housing than to the first end of the housing.

12. The apparatus of claim 11, further comprising one or more ports configured to route fluid from the flow sleeve to the interior cavity of the housing, wherein at least one of the one or more ports is disposed in a portion of the flow sleeve longitudinally between the baffle and the second end of the housing.

13. The apparatus of claim 1, further comprising first and second ports configured to route fluid from the flow sleeve to the interior cavity of the housing, wherein the first and second ports are of different sizes.

14. The apparatus of claim 1, wherein the baffle is configured to route fluid to one or more passageways between the baffle and an inner wall of the housing.

15. The apparatus of claim 1, wherein the liquid drain is disposed below the interior cavity and the gas outlet is disposed above the interior cavity.

* * * * *